(12) United States Patent  (10) Patent No.: US 8,879,864 B2
Uemura  (45) Date of Patent: Nov. 4, 2014

(54) GENERATING SUB-FRAME IMAGES FOR DRIVING DISPLAY

(75) Inventor: Shinichi Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 13/198,454

(22) Filed: Aug. 4, 2011

(65) Prior Publication Data

US 2012/0038646 A1 Feb. 16, 2012

(30) Foreign Application Priority Data

Aug. 12, 2010 (JP) ................. 2010-181101

(51) Int. Cl.
*G06K 9/40* (2006.01)
*G06K 9/32* (2006.01)
*G06T 3/40* (2006.01)
*H04N 7/01* (2006.01)

(52) U.S. Cl.
CPC ............ *G06T 3/4007* (2013.01); *H04N 7/0132* (2013.01); *H04N 7/0117* (2013.01); *G06T 2200/28* (2013.01)
USPC .......................................... 382/260; 382/300

(58) Field of Classification Search
None
See application file for complete search history.

(56) References Cited

U.S. PATENT DOCUMENTS

| | | | | |
|---|---|---|---|---|
| 5,262,970 A * | 11/1993 | Sevenhans et al. | ........... | 708/313 |
| 5,910,805 A * | 6/1999 | Hickey et al. | ................. | 345/467 |
| 6,047,091 A * | 4/2000 | Anderson | ...................... | 382/260 |
| 6,701,024 B1 * | 3/2004 | Sasai | .............................. | 382/260 |
| 7,301,549 B2 * | 11/2007 | Damera-Venkata | .......... | 345/698 |
| 7,366,746 B2 * | 4/2008 | Claassen et al. | .............. | 708/300 |
| 8,175,121 B2 * | 5/2012 | Fukuda et al. | ................ | 370/503 |
| 8,228,560 B2 * | 7/2012 | Hooper | ......................... | 358/3.27 |
| 8,401,327 B2 * | 3/2013 | Almbladh | ..................... | 382/260 |
| 8,537,283 B2 * | 9/2013 | Tran et al. | ..................... | 348/699 |
| 8,615,538 B1 * | 12/2013 | Fleizach et al. | .............. | 708/300 |
| 2003/0030827 A1 * | 2/2003 | Hirayama | ...................... | 358/1.9 |
| 2005/0024391 A1 * | 2/2005 | Damera-Venkata et al. | . | 345/698 |
| 2005/0093895 A1 * | 5/2005 | Damera-Venkata | .......... | 345/698 |
| 2005/0182803 A1 * | 8/2005 | Claassen et al. | .............. | 708/300 |
| 2006/0178759 A1 * | 8/2006 | Koehler | ......................... | 700/18 |
| 2006/0250407 A1 * | 11/2006 | Xu | ................................. | 345/582 |
| 2007/0057960 A1 * | 3/2007 | Itoh et al. | ...................... | 345/589 |
| 2007/0296742 A1 * | 12/2007 | Damera-Venkata | .......... | 345/698 |
| 2008/0143978 A1 * | 6/2008 | Damera-Venkata et al. | ... | 353/94 |
| 2008/0284763 A1 * | 11/2008 | Someya et al. | ............... | 345/204 |
| 2011/0141349 A1 * | 6/2011 | Albuz et al. | ................... | 348/441 |
| 2011/0211083 A1 * | 9/2011 | Petrides | ...................... | 348/208.4 |
| 2011/0255004 A1 * | 10/2011 | Tran et al. | ..................... | 348/699 |

FOREIGN PATENT DOCUMENTS

JP 9-214864 A 8/1997

\* cited by examiner

*Primary Examiner* — Wenpeng Chen
(74) *Attorney, Agent, or Firm* — Fitzpatrick, Cella, Harper & Scinto

(57) ABSTRACT

A frame image is input. First to Nth intermediate images are generated from the frame image. First to Nth sub-filters that have been generated by dividing an original filter are held, along with relative position information of pixels referred to by each of the sub-filters. Pixel values are collected of pixels in an ith intermediate range ($1 \leq i \leq N$). N sub-frame images are created by obtaining a pixel value of a pixel of interest in an ith sub-frame image from a calculation value obtained using the ith sub-filter with respect to the collected pixel values.

5 Claims, 12 Drawing Sheets

FIG. 3B

| | | | | | | | | | |
|---|---|---|---|---|---|---|---|---|---|
| K0·L0 | K1·L0 | K2·L0 | K3·L0 | K4·L0 | K5·L0 | K6·L0 | K7·L0 | K8·L0 | K9·L0 |
| K0·L1 | K1·L1 | K2·L1 | K3·L1 | K4·L1 | K5·L1 | K6·L1 | K7·L1 | K8·L1 | K9·L1 |
| K0·L2 | K1·L2 | K2·L2 | K3·L2 | K4·L2 | K5·L2 | K6·L2 | K7·L2 | K8·L2 | K9·L2 |
| K0·L3 | K1·L3 | K2·L3 | K3·L3 | K4·L3 | K5·L3 | K6·L3 | K7·L3 | K8·L3 | K9·L3 |
| K0·L4 | K1·L4 | K2·L4 | K3·L4 | K4·L4 | K5·L4 | K6·L4 | K7·L4 | K8·L4 | K9·L4 |
| K0·L5 | K1·L5 | K2·L5 | K3·L5 | K4·L5 | K5·L5 | K6·L5 | K7·L5 | K8·L5 | K9·L5 |
| K0·L6 | K1·L6 | K2·L6 | K3·L6 | K4·L6 | K5·L3 | K6·L6 | K7·L6 | K8·L6 | K9·L6 |
| K0·L7 | K1·L7 | K2·L7 | K3·L7 | K4·L7 | K5·L7 | K6·L7 | K7·L7 | K8·L7 | K9·L7 |
| K0·L8 | K1·L8 | K2·L8 | K3·L8 | K4·L8 | K5·L8 | K6·L8 | K7·L8 | K8·L8 | K9·L8 |
| K0·L9 | K1·L9 | K2·L9 | K3·L9 | K4·L9 | K5·L9 | K6·L9 | K7·L9 | K8·L9 | K9·L9 |

341, 342, 343, 344

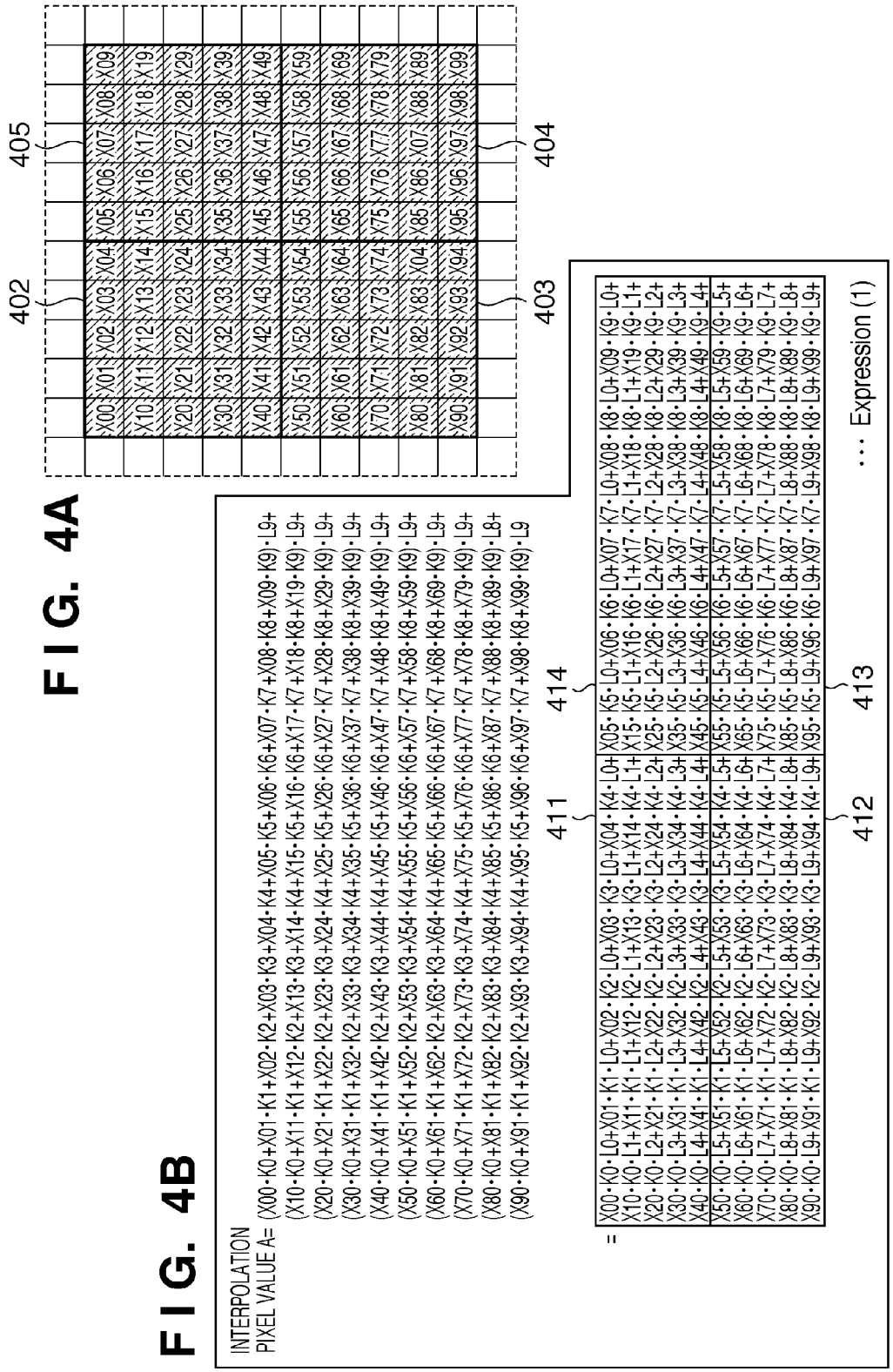

F I G. 6A
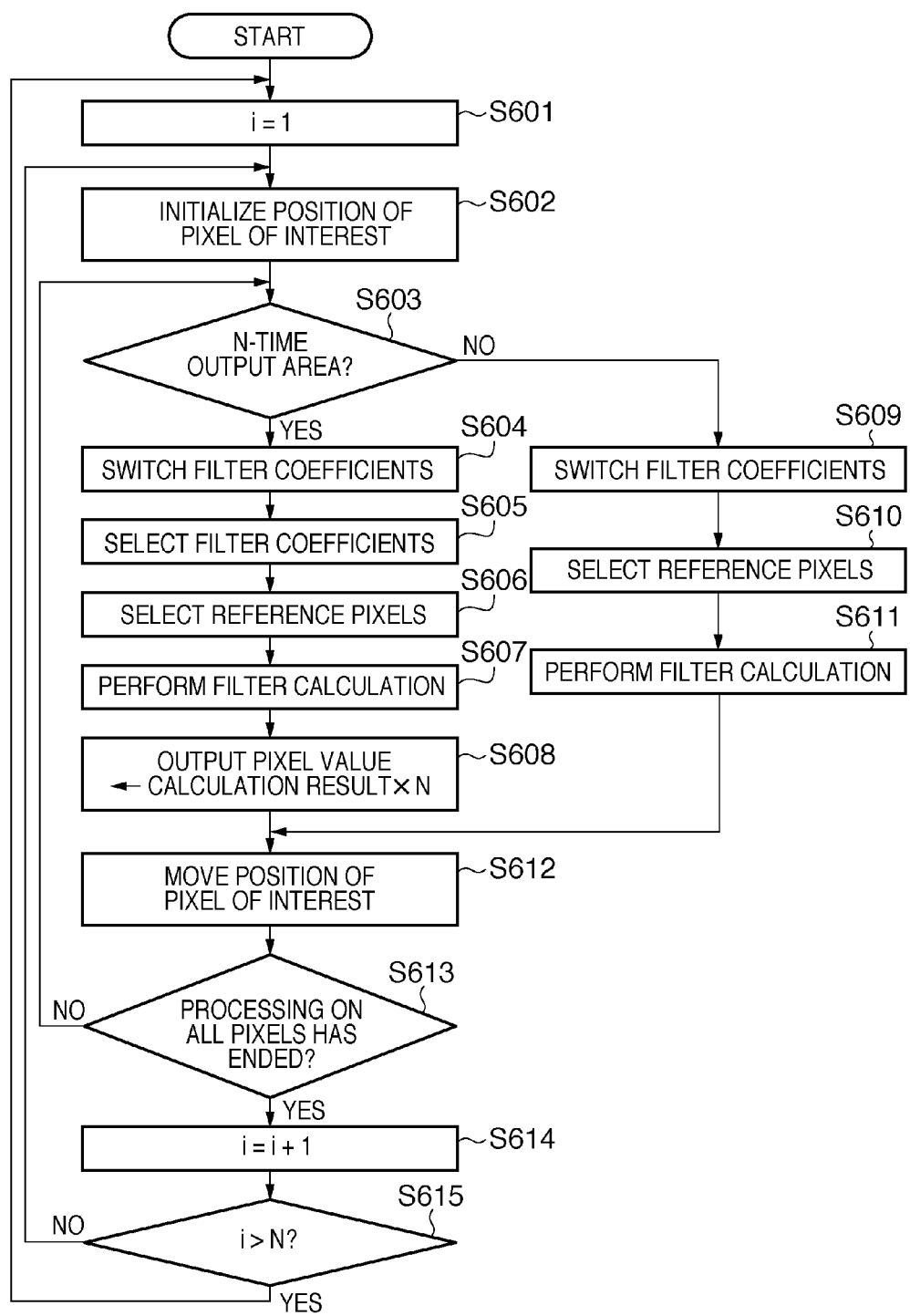

GENERATING SUB-FRAME IMAGES FOR DRIVING DISPLAY

BACKGROUND OF THE INVENTION

1. Field of the Invention

The present invention relates to filter processing technology for images.

2. Description of the Related Art

In recent years, there has been an increase in the screen size of a display and the resolution thereof (4K2K, 8K4K). Along with this, there is a demand for generating images with high quality in image processing such as resolution conversion. Filter processing using a two-dimensional filter is one of such image processing methods. A method of increasing the number of filter taps is one method for improving quality of images obtained by performing filter processing. However, in order to increase the number of taps, it is necessary to expand a calculation circuit, a line memory, and the like.

Japanese Patent Laid-Open No. 9-214864 discloses a method for enlarging image data while preventing such expansion of a calculation circuit, a line memory, and the like. In the method described in Japanese Patent Laid-Open No. 9-214864, a plurality of sub-frame images are generated by performing interpolation so as to repeat a pixel value of an adjacent pixel when performing enlargement processing. At this time, it is possible to cause pixels at the same position in different sub-frame images to have different pixel values. The average of the pixel values in the frame images will serve as an apparent pixel value by successively displaying such a plurality of frame images.

However, in the method disclosed in Japanese Patent Laid-Open No. 9-214864, a pixel value generated by interpolation is a repetition of another pixel value. It is desirable to perform image processing with higher precision in the present situation in which there is a demand for higher image quality.

SUMMARY OF THE INVENTION

The present invention provides technology for performing image processing using filter processing with higher precision while suppressing an increase in the size of a calculation circuit.

According to one aspect of the invention, an image processing apparatus for generating, from one frame image, first to Nth (N≥2) sub-frame images for NX-speed driving display, comprises: an input unit configured to input a frame image; a generation unit configured to generate, from the frame image, first to Nth intermediate images; a holding unit configured to hold first to Nth sub-filters that have been generated by dividing an original filter, and relative position information of pixels referred to by each of the sub-filters; a collection unit configured to collect pixel values of pixels in an ith intermediate image (1≤i≤N), the pixels being at relative positions indicated by the relative position information for an ith sub-filter with respect to a pixel of interest in the ith intermediate image; and a calculation unit configured to create the N sub-frame images by obtaining a pixel value of the pixel of interest in an ith sub-frame image from a calculation value obtained using the ith sub-filter with respect to the pixel values collected by the collection unit, wherein an average value of pixel values of a pixel in the N sub-frame images is the same as a value of that pixel obtained using the original filter with respect to the frame image.

According to another aspect of the invention, an image processing apparatus for generating, from one frame image, first to Nth (N≥2) sub-frame images for NX-speed driving display, comprises: an input unit configured to input a frame image; a generation unit configured to generate, from the frame image, first to Nth intermediate images by referring to two successive frame images and performing interpolation processing; a holding unit configured to hold first to Nth sub-filters that have been generated by dividing an original filter, and relative position information of pixels referred to by each of the sub-filters; a collection unit configured to collect pixel values of pixels in an ith intermediate image (1≤i≤N), the pixels being at relative positions indicated by the relative position information for an ith sub-filter with respect to a pixel of interest in the ith intermediate image; a determination unit configured to determine whether a pixel value of a pixel in neighborhood of a pixel of interest in each of the intermediate images is the same for the N intermediate images; and a calculation unit configured to create the N sub-frame images by obtaining a pixel value of the pixel of interest in an ith sub-frame image from a calculation value obtained using the ith sub-filter with respect to the pixel values collected by the collection unit, wherein the calculation unit is further configured to perform calculation using the ith sub-filter with respect to the pixel values collected by the collection unit if the determination unit determines that the pixel values are the same, and acquires, if the determination unit determines that the pixel values are not the same, pixel values of the pixel of interest in the sub-frame images by performing calculation using a filter other than the sub-filters with respect to the pixel values of the pixel in the neighborhood of the pixel of interest in the intermediate images, and an average value of the pixel values of the pixel of interest in the N sub-frame images that have been calculated by the calculation unit using the sub-filters is the same as a value obtained using the original filter with respect to a pixel value of a pixel in neighborhood of a pixel of interest in the frame image.

According to still another aspect of the invention, an image processing method for generating, from one frame image, first to Nth (N≥2) sub-frame images for NX-speed driving display, comprises the steps of: inputting a frame image; generating, from the frame image, first to Nth intermediate images; holding first to Nth sub-filters that have been generated by dividing an original filter, and relative position information of pixels referred to by each of the sub-filters; collecting pixel values of pixels in an ith intermediate image (1≤i≤N), the pixels being at relative positions indicated by the relative position information for an ith sub-filter with respect to a pixel of interest in the ith intermediate image; and creating the N sub-frame images by obtaining a pixel value of the pixel of interest in an ith sub-frame image from a calculation value obtained using the ith sub-filter with respect to the pixel values collected by the collection unit, wherein an average value of pixel values of a pixel in the N sub-frame images is the same as a value of that pixel obtained using the original filter with respect to the frame image.

According to an aspect of the present invention, image processing can be performed using filter processing with higher precision while suppressing an increase in the size of a calculation circuit.

Further features of the present invention will become apparent from the following description of exemplary embodiments with reference to the attached drawings.

BRIEF DESCRIPTION OF THE DRAWINGS

FIGS. 3A and 3B are diagrams illustrating filter processing according to Embodiment 1.

FIGS. 4A and 4B are diagrams illustrating filter processing according to Embodiment 1.

FIGS. 6A and 6B are flowcharts showing processing according to Embodiment 1.

DESCRIPTION OF THE EMBODIMENTS

Embodiment 1

Figure 1:
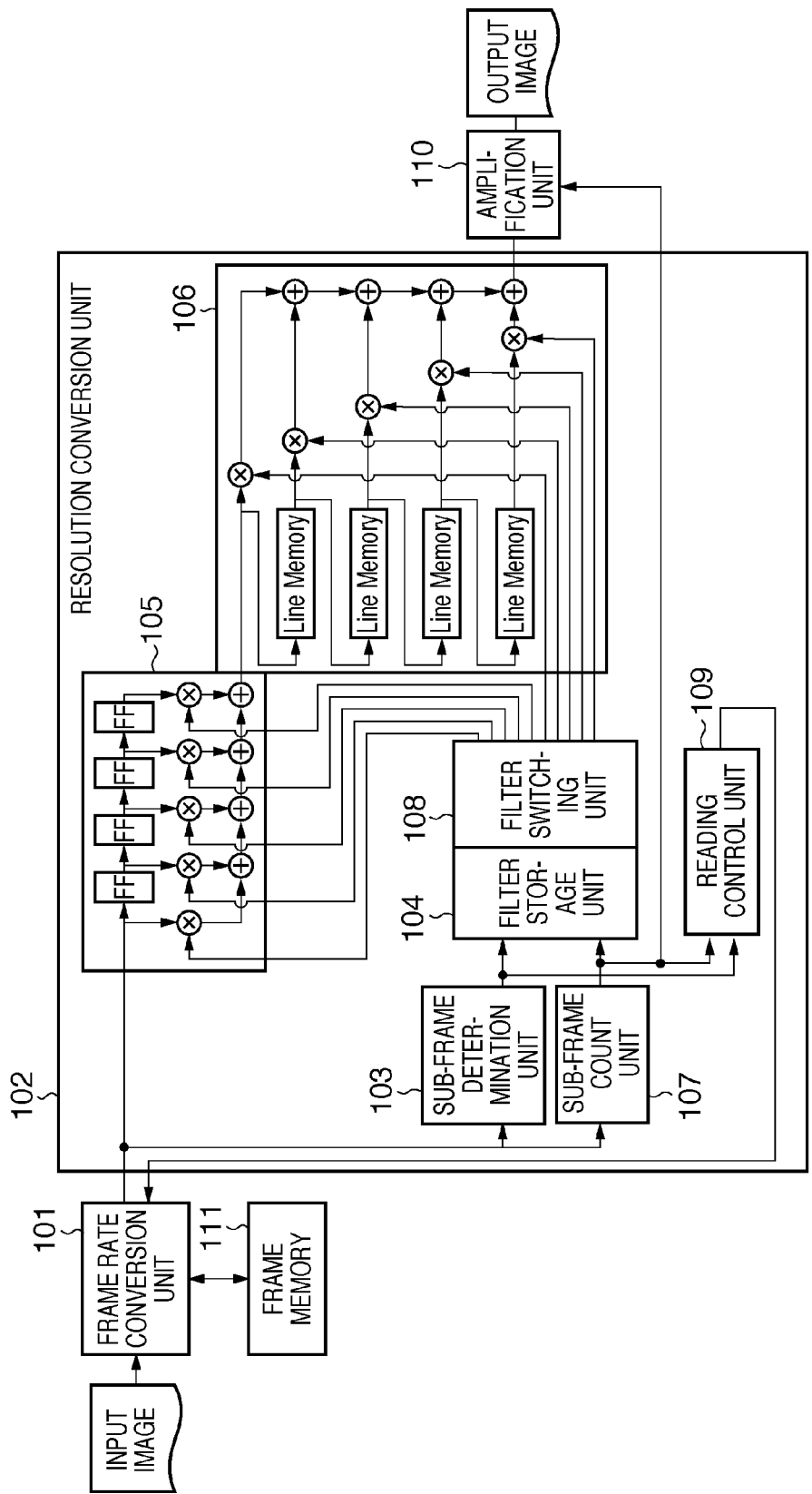
FIG. 1 is a block diagram showing a configuration of an image processing apparatus according to Embodiment 1.

In the present embodiment, a moving image is displayed by 4×-speed driving. For example, if a 60 Hz moving image is input, that moving image is converted into a 240 Hz moving image, and the converted moving image is output. Moreover, a frame image is enlarged by performing filter processing on that frame image. FIG. 1 is a block diagram according to the present embodiment.

A frame rate conversion unit 101 is provided with a frame memory 111. The frame rate conversion unit 101 converts one frame image that has been input into four sub-frames (intermediate images) (conversion unit). At this time, the frame rate conversion unit 101 may generate sub-frames as images that interpolate one frame image and the subsequent frame image by performing interpolation processing using a known method such as motion detection. Then, the frame rate conversion unit 101 outputs the four sub-frames to a resolution conversion unit 102.

The resolution conversion unit 102 enlarges each of the four sub-frames. The resolution conversion unit 102 is provided with a sub-frame determination unit 103, a filter storage unit 104, a horizontal calculation circuit 105, and a perpendicular calculation circuit 106. The resolution conversion unit 102 is further provided with a sub-frame count unit 107, a filter switching unit 108, a reading control unit 109, and an amplification unit 110.

The sub-frame determination unit 103 determines whether or not an area in which filter processing is performed is the same for the four sub-frame images that have been acquired from the frame rate conversion unit 101. The sub-frame determination unit 103 changes filter coefficients output from the filter storage unit 104 (holding unit) based on the determination result. The horizontal calculation circuit 105 and the perpendicular calculation circuit 106 constitute a 5×5 tap two-dimensional FIR filter. The horizontal calculation circuit 105 and the perpendicular calculation circuit 106 perform filter processing on sub-frame images using filter coefficients stored in the filter storage unit 104. In the present embodiment, the horizontal calculation circuit 105 and the perpendicular calculation circuit 106 obtain pixel values of interpolation pixels that are necessary for enlargement processing.

The sub-frame count unit 107 acquires the number of sub-frames (four in the present embodiment) generated from one frame image, from the frame rate conversion unit 101. Further, the sub-frame count unit 107 determines which position a sub-frame is at in the order of sub-frames with respect to one frame image. The filter switching unit 108 selects filter coefficients from the filter storage unit 104 based on information from the sub-frame count unit 107, and outputs the selected filter coefficients to the horizontal calculation circuit 105 and the perpendicular calculation circuit 106. The filter storage unit 104 further holds relative position information of pixels to which filter coefficients are respectively applied.

The reading control unit 109 controls which pixel value in a sub-frame image (intermediate image) to be output from the frame rate conversion unit 101 to the horizontal calculation circuit 105 and the perpendicular calculation circuit 106 (collection unit). The amplification unit 110 increases the value output from the horizontal calculation circuit 105 and the perpendicular calculation circuit 106 by four times, and outputs the resultant value. By performing these processes, the resolution conversion unit 102 creates sub-frame images on which filter processing has been performed.

Figure 2:
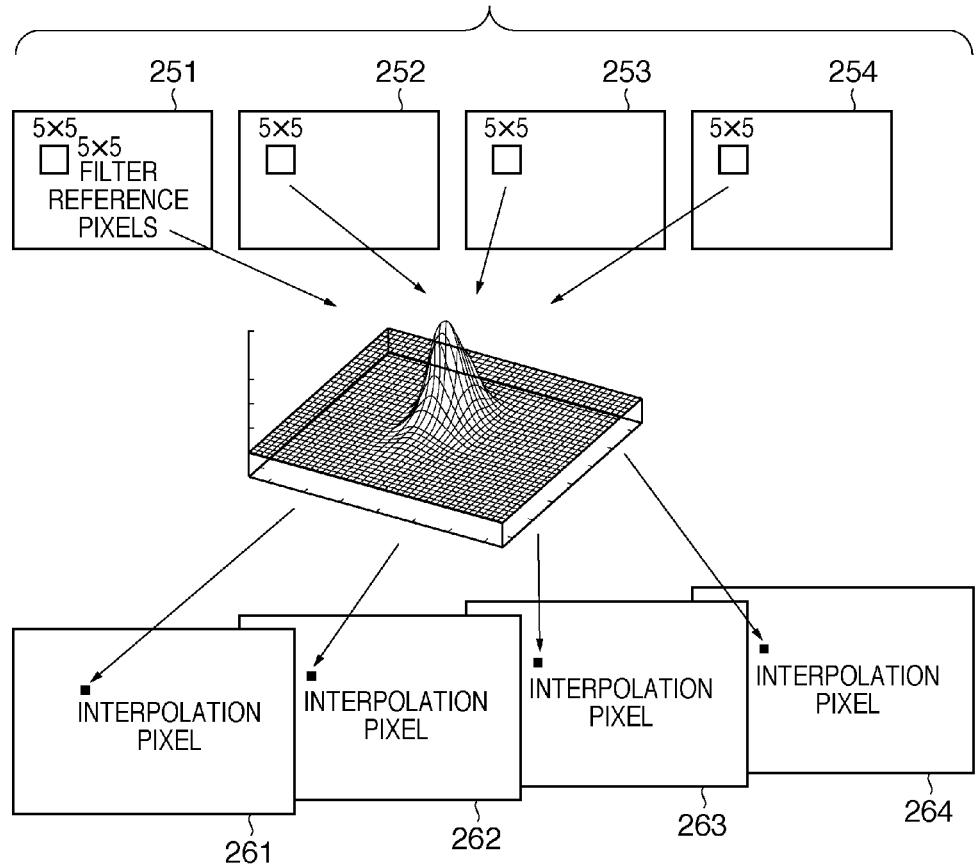
FIG. 2 is a diagram illustrating filter processing according to Embodiment 1.
Figure 3A:
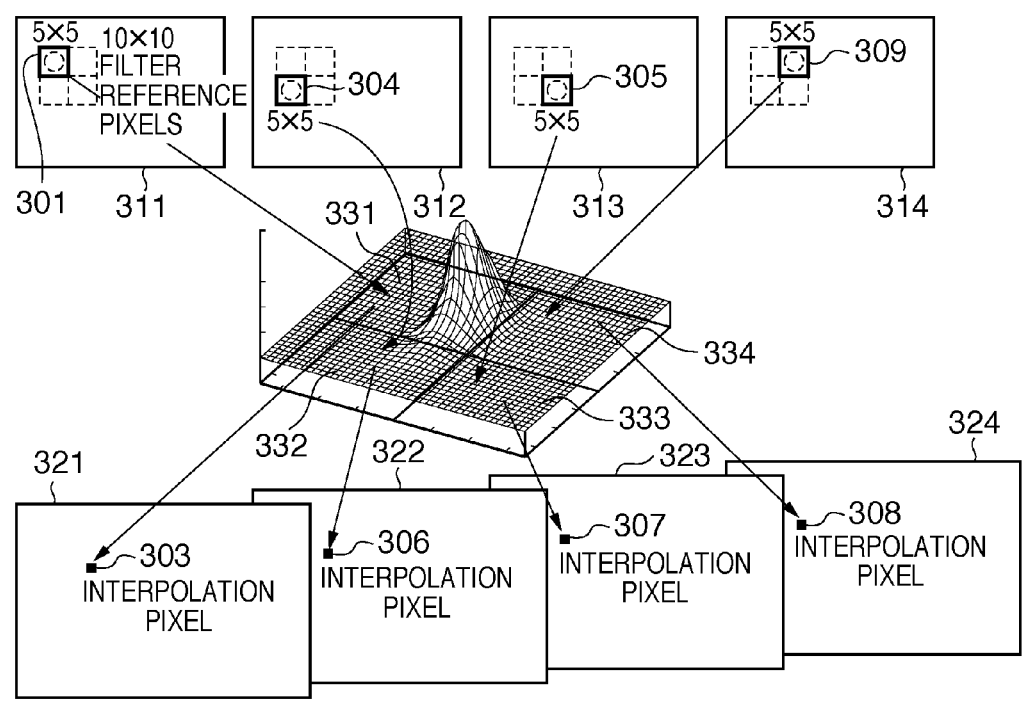

FIGS. 2, 3A, and 3B show the outline of processing performed in the present embodiment. FIG. 2 shows processing performed when an image in an area in which filter processing is performed is not the same for four sub-frames. FIG. 2 corresponds to a case where sub-frames are generated as interpolation images of two frames, using a known method such as motion detection. In the case where sub-frames serve as interpolation images, filter processing using 5×5 filter coefficients is performed as shown in FIG. 2. In this way, pixel values of interpolation pixels necessary for enlargement processing are obtained. In the present embodiment, output sub-frames 261 to 264 are generated by performing filter processing on input sub-frames 251 to 254. If filter processing is performed in order to obtain a pixel value of a pixel of interest, the position of a pixel referred to by a filter relative to the pixel of interest is common in all the four sub-frames.

FIG. 3A shows processing performed when an image in an area in which filter processing is performed is the same for four sub-frames. In this case the 5×5 tap filter (the horizontal calculation circuit 105 and the perpendicular calculation circuit 106) calculates interpolation pixel values by referring to 10×10 filter coefficients and 10×10 pixels. Processing shown in FIG. 3A will be described in more detail with reference to FIGS. 4A and 4B. In the processing shown in FIG. 3A, 10×10 filter coefficients shown in FIG. 3B are used. The filter coefficients in FIG. 3B are obtained from filter functions 331 to 334 shown in FIG. 3A.

In FIG. 3A, filter processing is performed on a first sub-frame 311, a second sub-frame 312, a third sub-frame 313, and a fourth sub-frame 314. Then, a first sub-frame 321, a second sub-frame 322, a third sub-frame 323, and a fourth sub-frame 324 are generated. An interpolation pixel 303 in the first sub-frame, an interpolation pixel 306 in the second sub-frame, an interpolation pixel 307 in the third sub-frame, and an interpolation pixel 308 in the fourth sub-frame that are shown in FIG. 3A exist at the same position.

In order to obtain the pixel value of the interpolation pixel 303, a filter coefficient group (341) (sub-filter) at the upper left of FIG. 3B is applied to 5×5 pixels (301) positioned at the upper left of the position of the interpolation pixel 303 in the present embodiment. Similarly, a filter coefficient group 342 is applied to a pixel group 304. A filter coefficient group 344 is applied to a pixel group 305. A filter coefficient group 343 is applied to a pixel group 309. As described, in each filter coefficient, relative position information of a pixel to which the filter coefficient is applied is specified. The filter coefficient groups 341 to 344 are obtained by dividing an original filter that includes the groups 341 to 344.

The first to fourth sub-frames 321 to 324 are successively displayed, and thus the interpolation pixels 303, 306, 307, and 308 are also successively displayed. Accordingly, due to the accumulated luminance visual recognition effect, the interpolation pixel value perceived by human eyes will be an average value of the interpolation pixels 303, 306, 307, and 308. By appropriately correcting the interpolation pixel values obtained by performing filter processing (by increasing the values four times in the present embodiment), the average value of the interpolation pixels will be equal to an interpolation pixel value calculated using a 10×10 tap filter.

Figure 9A:
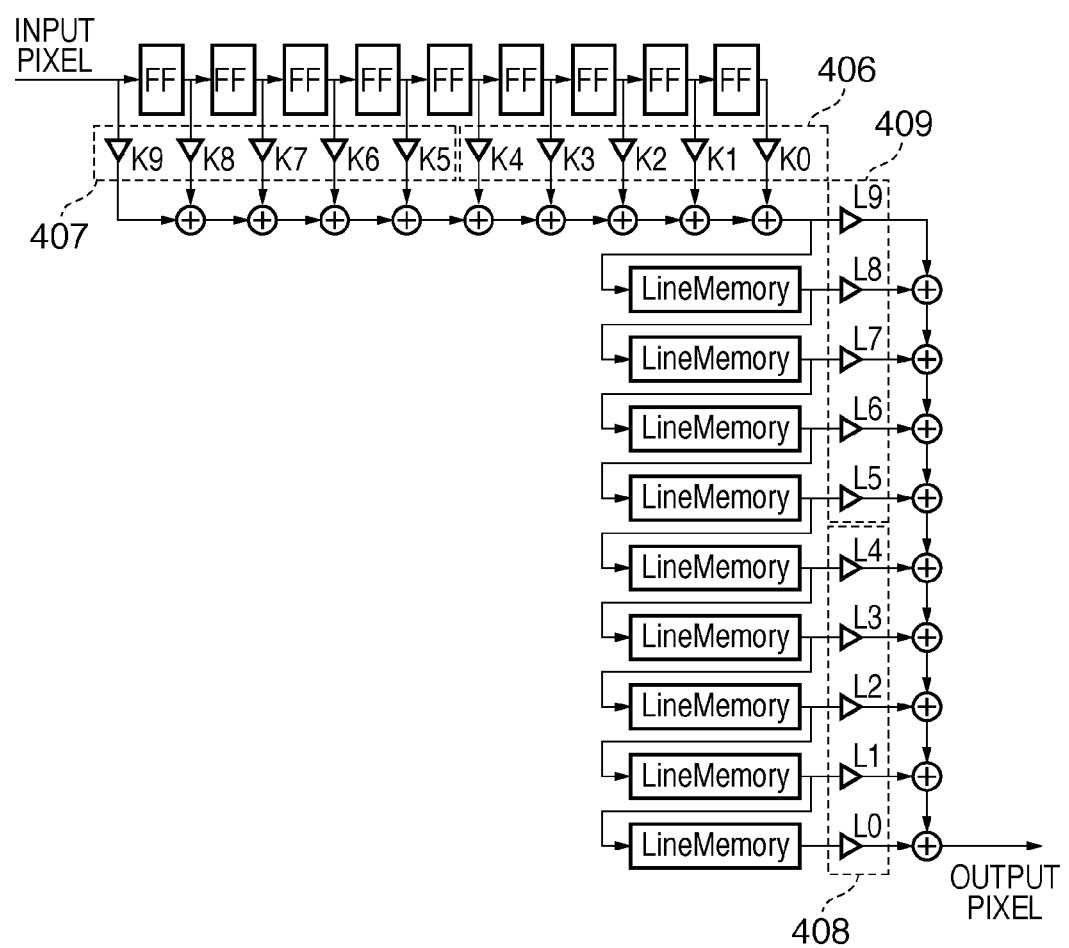
FIGS. 9A and 9B are diagrams illustrating filter processing according to Embodiment 1.

Next is a more detailed description of processing in the present embodiment with reference to FIGS. 4A, 4B, 5A to 5D, and 9A to 9B. In the present embodiment, a sub-frame image in FIG. 4A is enlarged so as to be doubled in both the vertical and horizontal directions, as in FIG. 9B. Here, the pixel value of an interpolation pixel 401 in FIG. 9B will be obtained. If a 10×10 tap FIR filter shown in FIG. 9A is used, a pixel value A of the interpolation pixel 401 is obtained by Expression (1) shown in FIG. 4B.

In the present embodiment, the value corresponding to reference numeral 411 is assumed to be the value of the interpolation pixel 401 in the first sub-frame. Further, the value corresponding to reference numeral 412 is assumed to be the value of the interpolation pixel 401 in the second sub-frame. Moreover, the value corresponding to reference numeral 413 is assumed to be the value of the interpolation pixel 401 in the third sub-frame. Moreover, the value corresponding to reference numeral 414 is assumed to be the value of the interpolation pixel 401 in the fourth sub-frame.

In the present embodiment, the values obtained by increasing the values shown by reference numerals 411 to 414 by four times are assumed to be the values of the interpolation pixel 401. This is because if an interpolation pixel value is multiplied by the number of sub-frames (N, specifically, 4 in the present embodiment), the average value of the values of the interpolation pixel 401 in the sub-frames is equal to an interpolation pixel value calculated using a 10×10 tap filter. This is shown by Expressions (2) to (5) below. However, filter coefficients may be adjusted in advance, so that it will not be necessary to multiply an interpolation pixel value by the number of sub-frames (N). For example, filter coefficients used in the present embodiment may be obtained by multiplying filter coefficients used in a 10×10 tap filter by N.

If the pixel value of the interpolation pixel 401 in the first sub-frame is assumed to be A1, A1 is as follows:

$$A1=(X00 \cdot K0 \cdot L0+X01 \cdot K1 \cdot L0+X02 \cdot K2 \cdot L0+X03 \cdot K3 \cdot L0+ \\ X04 \cdot K4 \cdot L0+X10 \cdot K0 \cdot L1+X11 \cdot K1 \cdot L1+X12 \cdot K2 \cdot L1+ \\ X13 \cdot K3 \cdot L1+X14 \cdot K4 \cdot L1+X20 \cdot K0 \cdot L2+X21 \cdot K1 \cdot L2+ \\ X22 \cdot K2 \cdot L2+X23 \cdot K3 \cdot L2+X24 \cdot K4 \cdot L2+X30 \cdot K0 \cdot L3+ \\ X31 \cdot K1 \cdot L3+X32 \cdot K2 \cdot L3+X33 \cdot K3 \cdot L3+X34 \cdot K4 \cdot L3+ \\ X40 \cdot K0 \cdot L4+X41 \cdot K1 \cdot L4+X42 \cdot K2 \cdot L4+X43 \cdot K3 \cdot L4+ \\ X44 \cdot K4 \cdot L4) \times 4 \quad (2)$$

If the pixel value of the interpolation pixel 401 in the second sub-frame is assumed to be A2, A2 is as follows:

$$A2=(X50 \cdot K0 \cdot L5+X51 \cdot K1 \cdot L5+X52 \cdot K2 \cdot L5+X53 \cdot K3 \cdot L5+ \\ X54 \cdot K4 \cdot L5+X60 \cdot K0 \cdot L6+X61 \cdot K1 \cdot L6+X62 \cdot K2 \cdot L6+ \\ X63 \cdot K3 \cdot L6+X64 \cdot K4 \cdot L6+X70 \cdot K0 \cdot L7+X71 \cdot K1 \cdot L7+ \\ X72 \cdot K2 \cdot L7+X73 \cdot K3 \cdot L7+X74 \cdot K4 \cdot L7+X80 \cdot K0 \cdot L8+ \\ X81 \cdot K1 \cdot L8+X82 \cdot K2 \cdot L8+X83 \cdot K3 \cdot L8+X84 \cdot K4 \cdot L8+ \\ X90 \cdot K0 \cdot L9+X91 \cdot K1 \cdot L9+X92 \cdot K2 \cdot L9+X43 \cdot K3 \cdot L9+ \\ X94 \cdot K4 \cdot L9) \times 4 \quad (3)$$

If the pixel value of the interpolation pixel 401 in the third sub-frame is assumed to be A3, A3 is as follows:

$$A3=(X55 \cdot K5 \cdot L5+X56 \cdot K6 \cdot L5+X57 \cdot K7 \cdot L5+X58 \cdot K8 \cdot L5+ \\ X59 \cdot K9 \cdot L5+X65 \cdot K5 \cdot L6+X66 \cdot K6 \cdot L6+X67 \cdot K7 \cdot L6+ \\ X68 \cdot K8 \cdot L6+X69 \cdot K9 \cdot L6+X75 \cdot K5 \cdot L7+X76 \cdot K6 \cdot L7+ \\ X77 \cdot K7 \cdot L7+X78 \cdot K8 \cdot L7+X79 \cdot K9 \cdot L7+X85 \cdot K5 \cdot L8+ \\ X86 \cdot K6 \cdot L8+X87 \cdot K7 \cdot L8+X88 \cdot K8 \cdot L8+X89 \cdot K9 \cdot L8+ \\ X95 \cdot K5 \cdot L9+X96 \cdot K6 \cdot L9+X97 \cdot K7 \cdot L9+X98 \cdot K8 \cdot L9+ \\ X99 \cdot K9 \cdot L9) \times 4 \quad (4)$$

If the pixel value of the interpolation pixel 401 in the fourth sub-frame is assumed to be A4, A4 is as follows:

$$A4=(X05 \cdot K5 \cdot L0+X06 \cdot K6 \cdot L0+X07 \cdot K7 \cdot L0+X08 \cdot K8 \cdot L0+ \\ X09 \cdot K9 \cdot L0+X15 \cdot K5 \cdot L1+X16 \cdot K6 \cdot L1+X17 \cdot K7 \cdot L1+ \\ X18 \cdot K8 \cdot L1+X19 \cdot K9 \cdot L1+X25 \cdot K5 \cdot L2+X26 \cdot K6 \cdot L2+ \\ X27 \cdot K7 \cdot L2+X28 \cdot K8 \cdot L2+X29 \cdot K9 \cdot L2+X35 \cdot K5 \cdot L3+ \\ X36 \cdot K6 \cdot L3+X37 \cdot K7 \cdot L3+X38 \cdot K8 \cdot L3+X39 \cdot K9 \cdot L3+ \\ X45 \cdot K5 \cdot L4+X46 \cdot K6 \cdot L4+X47 \cdot K7 \cdot L4+X48 \cdot K8 \cdot L4+ \\ X49 \cdot K9 \cdot L4) \times 4 \quad (5)$$

An average pixel value Am of the interpolation pixel values A1 to A4 obtained in accordance with Expressions (2) to (5) is obtained in accordance with Expression (6) below.

$$Am=(A1+A2+A3+A4)/4 \quad (6)$$

The average pixel value Am is equal to the pixel value A calculated using a 10×10 tap FIR filter and obtained in accordance with Expression (1) in FIG. 4B. Specifically, the interpolation pixel value perceived by human eyes when the sub-frames generated in accordance with the present embodiment are successively displayed will be equal to the interpolation pixel value perceived by human eyes when sub-frames generated using a 10×10 tap filter are displayed.

Figure 5A:
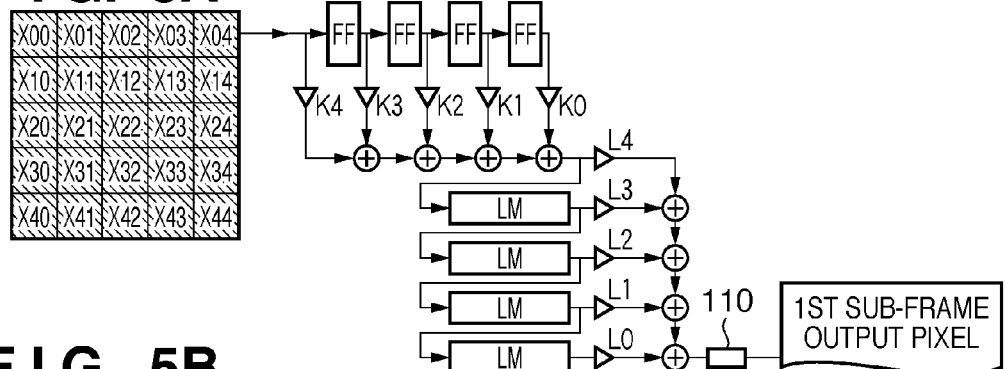
FIGS. 5A to 5D are diagrams illustrating filter processing according to Embodiment 1.

The calculation represented by Expression (2) can be realized using a 5×5 tap filter circuit and a 2-bit shifter as shown in FIG. 5A. The filter circuit in FIG. 5A refers to an upper left pixel group 402 having 5×5 pixels among 10×10 reference pixels shown in FIG. 4A. Further, the filter circuit in FIG. 5A uses the upper left coefficient group 341 having 5×5 coefficients among the filter coefficients shown in FIG. 3B. The value output from the filter circuit can be increased by four times by the two bit shifter shifting that value output from the filter circuit by two bits to the left (toward the most significant bit).

Figure 5B:
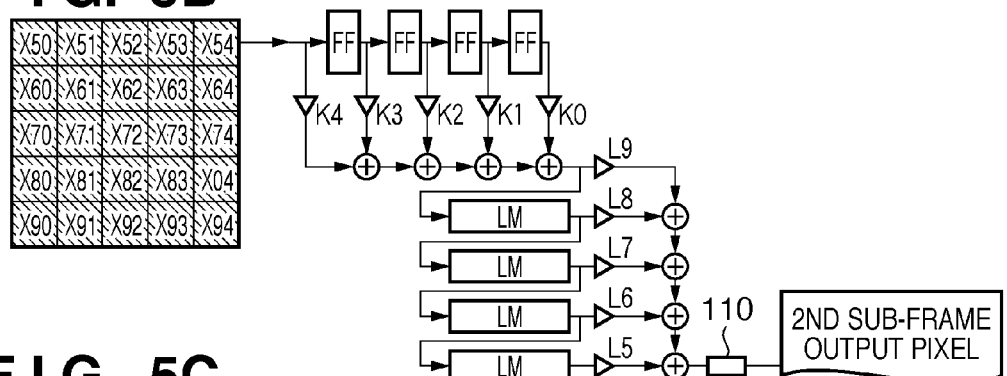

Similarly, the calculation represented by Expression (3) can be realized using a 5×5 tap filter circuit and a 2-bit shifter, as shown in FIG. 5B. The filter circuit in FIG. 5B refers to a lower left pixel group 403 having 5×5 pixels among 10×10 reference pixels shown in FIG. 4A. Further, the filter circuit in FIG. 5B uses the lower left coefficient group 342 having 5×5 coefficients among the filter coefficients shown in FIG. 3B.

Figure 5C:
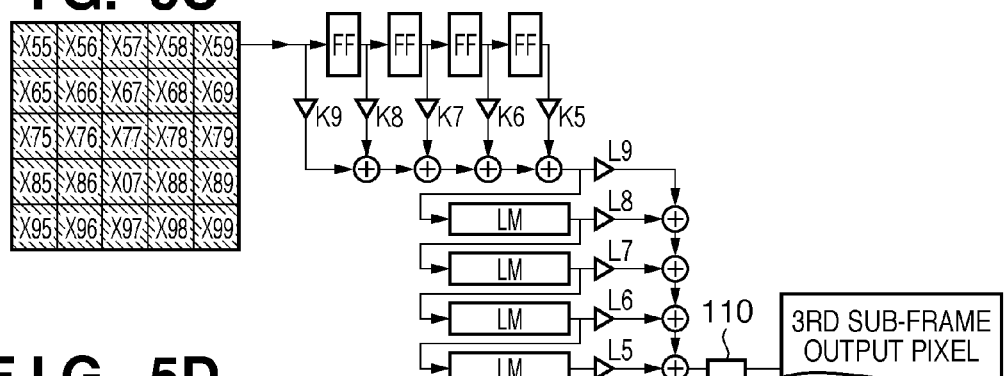

The calculation represented by Expression (4) can also be realized using a 5×5 tap filter circuit and a 2-bit shifter, as shown in FIG. 5C. The filter circuit in FIG. 5C refers to a lower right pixel group 404 having 5×5 pixels among the 10×10 reference pixels shown in FIG. 4A. Further, the filter circuit of FIG. 5C uses the lower right coefficient group 344 having 5×5 coefficients among the filter coefficients shown in FIG. 3B.

Figure 5D:
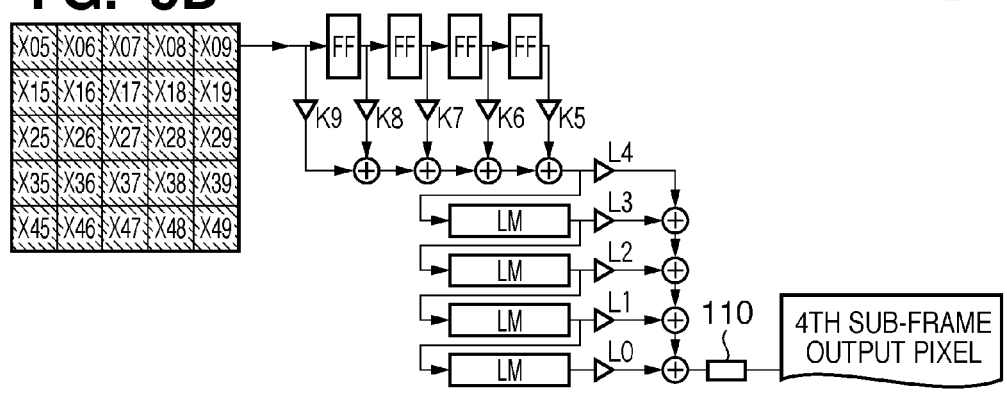

The calculation represented by Expression (5) can also be realized using a 5×5 tap filter circuit and a 2-bit shifter as shown in FIG. 5D. The filter circuit in FIG. 5D refers to an upper right pixel group 405 having 5×5 pixels among the 10×10 reference pixels shown in FIG. 4A. Further, the filter circuit in FIG. 5D uses the upper right coefficient group 343 having 5×5 coefficients among the filter coefficients shown in FIG. 3B.

In the present embodiment, the configuration in FIGS. 5A to 5D described above is realized using the horizontal calculation circuit 105 and the perpendicular calculation circuit 106 with 5×5 taps. In the present embodiment, the FIR filters in FIGS. 5A to 5D are used. Accordingly, in the present embodiment, 25 coefficients will not be set with respect to the horizontal calculation circuit 105 and the perpendicular calculation circuit 106, but rather in practice, five coefficients are set with respect to the horizontal calculation circuit 105, and five coefficients are set with respect to the perpendicular calculation circuit 106.

The circuits in FIG. 5A to 5D use different filter coefficients. Further, the pixels to be referred to are also different. In the present embodiment, the filter switching unit 108 changes filter coefficients used by the horizontal calculation circuit 105 and the perpendicular calculation circuit 106. Further, the reading control unit 109 changes pixels referred to by the horizontal calculation circuit 105 and the perpendicular calculation circuit 106. In this way, the result of 10×10 tap filter calculation can be obtained using a 5×5 tap filter circuit by utilizing the accumulated luminance visual recognition effect.

Next is a description of processing according to the present embodiment with reference to the flowchart in FIG. 6A. It is assumed that conversion processing performed by the frame rate conversion unit 101 has ended before the start of step S601. In step S601, the sub-frame count unit 107 initializes i to 1. It is sufficient to perform this initialization when the first sub-frame is input or when processing on the fourth sub-frame ends. The sub-frame number of a processing target is denoted by i, and i is as follows: 1≤i≤N. N sub-frames, namely, first to Nth sub-frames are input. That is, N denotes the number of sub-frames.

In step S602, the reading control unit 109 initializes the position of a pixel of interest. For example, it is sufficient for the reading control unit 109 to use the upper-leftmost pixel of a sub-frame image as a pixel of interest. In this case, it is sufficient for the reading control unit 109 to sequentially select a pixel of interest in the raster order in step S612.

In step S603, the sub-frame determination unit 103 determines whether or not an image in an area in which filter processing is performed is the same for four sub-frames (determination unit). That is, it is determined with respect to images in areas in which filter processing is performed whether interpolation images are generated or the same image is repeated four times (output four times). Specifically, it may be determined whether or not the pixel value of a pixel of interest is the same for the four sub-frames. Further, it may be determined whether or not an image in the neighborhood of a pixel of interest is the same for the four sub-frames. Moreover, it may be determined whether or not the pixel value of a pixel referred to in filter processing is the same for the four sub-frames.

The sub-frame determination unit 103 may perform determination in step S603 by referring to sub-frame images stored in the frame rate conversion unit 101 or the frame memory 111. Further, the sub-frame determination unit 103 may send, to the frame rate conversion unit 101, an inquiry as to whether or not an image in an area in which filter processing is performed is the same for four sub-frames.

If it is determined in step S603 that the same image is output four times, the processing proceeds to step S604. Further, if it is determined that the same image is not output four times, the processing proceeds to step S609. In step S604, the sub-frame determination unit 103 sets the filter storage unit 104 such that the filter storage unit 104 outputs 10×10 coefficients as shown in FIG. 3B. In step S605, the filter switching unit 108 selects 5×5 filter coefficients for a sub-frame number i from among the 10×10 filter coefficients output from the filter storage unit 104.

It is sufficient for the filter switching unit 108 to select the filter coefficient group 341 for the first sub-frame. It is sufficient for the filter switching unit 108 to select the filter coefficient group 342 for the second sub-frame. It is sufficient for the filter switching unit 108 to select the filter coefficient group 344 for the third sub-frame. It is sufficient for the filter switching unit 108 to select the filter coefficient group 343 for the fourth sub-frame. Then, the filter switching unit 108 sets the selected filter coefficients in the horizontal calculation circuit 105 and the perpendicular calculation circuit 106. As described above, in the present embodiment, the filter switching unit 108 sets five coefficients in the horizontal calculation circuit 105, and sets five coefficients in the perpendicular calculation circuit 106.

In step S606, the reading control unit 109 reads pixel values of reference pixels from the frame rate conversion unit 101 or the frame memory 111 in accordance with the sub-frame number. For example, if a pixel of interest is X44 in FIG. 4A, the reading control unit 109 may read the pixel values of pixels in the pixel group 402 for the first sub-frame. Further, the reading control unit 109 may read the pixel values of pixels in the pixel group 403 for the second sub-frame. The reading control unit 109 may read the pixel values of pixels in the pixel group 404 for the third sub-frame. The reading control unit 109 may read the pixel values of pixels in the pixel group 405 for the fourth sub-frame.

The timing at which the reading control unit 109 reads the pixel values of pixels in the pixel group 402 is assumed to be a normal timing. In this case, the reference pixels of the second sub-frame are data of pixels at five lines below relative to the reference pixels of the first sub-frame, and thus the reading control unit 109 may perform reading at a timing offset by five lines relative to the normal timing. The reference pixels of the third sub-frame are data of pixels shifted by five dots to the right and five lines below relative to the reference pixels of the first sub-frame, and thus the reading control unit 109 may perform reading at a timing offset by five dots and five lines relative to the normal timing. The reference pixels of the fourth sub-frame are data of pixels shifted by five dots to the right relative to the reference pixels of the first sub-frame, and thus the reading control unit 109 may perform reading at a timing offset by five dots relative to the normal timing.

In step S607, the horizontal calculation circuit 105 and the perpendicular calculation circuit 106 perform 5×5 tap filter calculation using the filter coefficients set in step S605 and the reference pixels read in step S606. In step S608, the amplification unit 110 outputs a value obtained by increasing the result in step S607 by four times, as an output pixel value.

In step S609, the sub-frame determination unit 103 sets the filter storage unit 104 such that the filter storage unit 104 outputs 5×5 filter coefficients. Moreover, the filter switching unit 108 sets the filter coefficients output by the filter storage unit 104 in the horizontal calculation circuit 105 and the perpendicular calculation circuit 106. In step S610, the reading control unit 109 reads 5×5 reference pixels in the neighborhood of the pixel of interest.

Figure 9B:
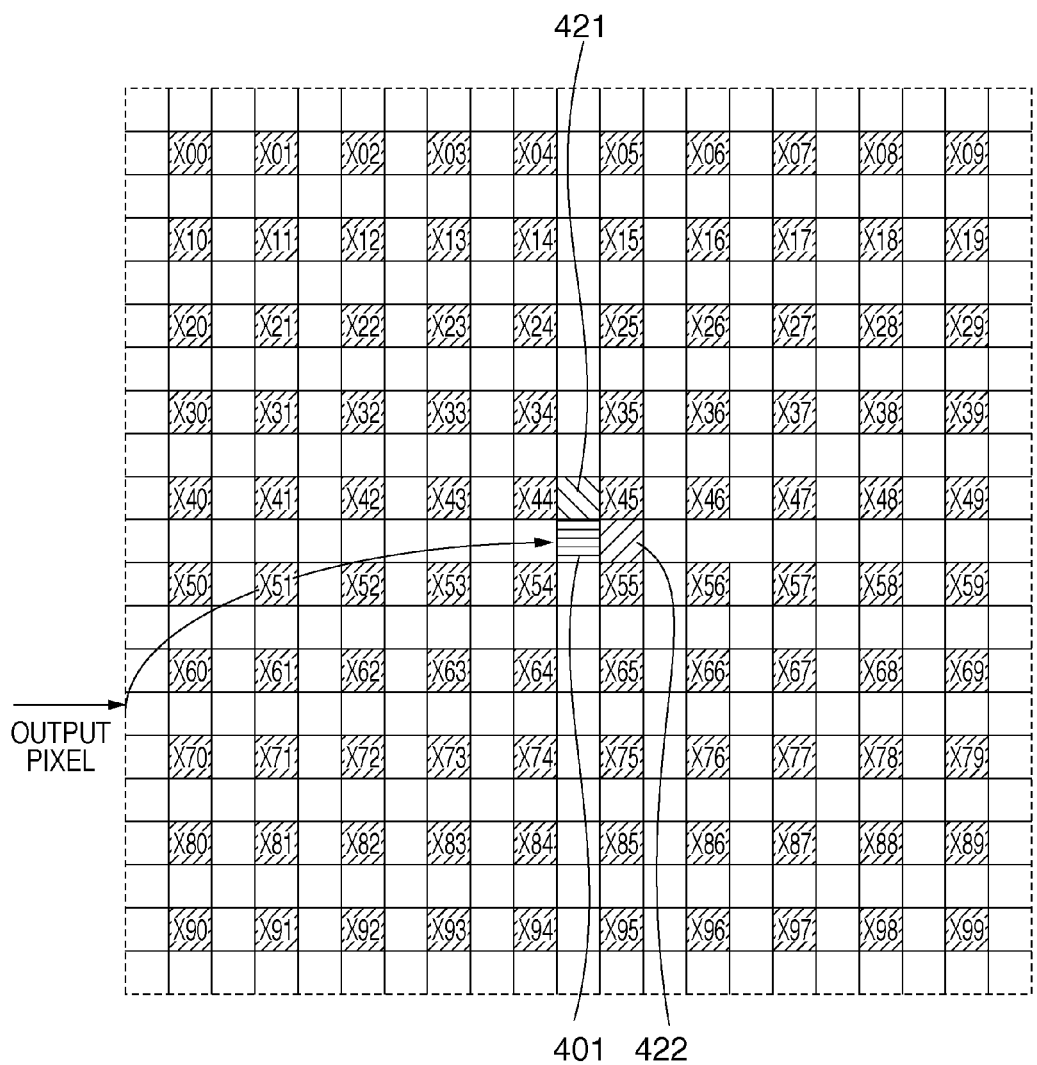

In step S611, the horizontal calculation circuit 105 and the perpendicular calculation circuit 106 perform filter calculation using the filter coefficients set in step S609 and the pixel values of the reference pixels read in step S610. Then, the horizontal calculation circuit 105 and the perpendicular calculation circuit 106 output the calculated result as an output pixel value. After the end of the processing shown in FIG. 6A, an enlarged image shown in FIG. 9B is generated such that the output pixel value obtained using the pixel X44 as a pixel of interest is a pixel value of the pixel 401, for example.

In step S612, the reading control unit 109 selects a pixel of interest in the raster order, for example. In step S613, the reading control unit 109 determines whether or not processing has been performed on all the pixels in the ith sub-frame. If processing has not ended with respect to all the pixels, the processing returns to step S603. If processing has ended with respect to all the pixels, the processing proceeds to step S614.

In step S614, the sub-frame count unit 107 adds 1 to i. In step S615, the sub-frame count unit 107 determines whether or not processing on all the sub-frames has ended. Specifically, it is sufficient for the sub-frame count unit 107 to determine whether or not i>N. If processing on all the sub-frames has not ended, the processing returns to step S602, and processing on the next sub-frame is performed. If processing on all the sub-frames has ended, the processing returns to step S601. In step S601, i is initialized to 1, and a series of processes is repeated with respect to the frame image that is input next.

As described above, in the present embodiment, when sub-frame images are generated, filter processing on a pixel of interest at the same position is performed using different filter coefficients and reference pixels. In this way, the number of taps for filter calculation can be increased without increasing a circuit scale. In the present embodiment in which 4×-speed processing is performed, the same effects as those of 10×10 tap filter processing can be obtained, although a filter circuit has 5×5 taps. In other words, it is possible to realize 10×10 tap filter processing using a 5×5 tap filter circuit.

Moreover, there are cases where an area in which an image is different for sub-frames (interpolation areas) and an area in which an image is the same for the sub-frames (area in which the image is output four times) both exist in sub-frame images. The method disclosed in Japanese Patent Laid-Open No. 09-214864 is mainly aimed at converting the resolution of still images. It is also possible to perform filter processing on still images using the method in the present embodiment. Meanwhile, according to the method in the present embodiment, filter processing can be correctly performed even on moving images. Specifically, if sub-frames are generated so as to interpolate frame images, an area in which an image is different for the sub-frames exists.

In the present embodiment, as described above, 5×5 tap filter processing is performed with respect to an area in which an image is different for sub-frames. By changing filter processing between an area in which an image is different for sub-frames and an area in which an image is the same for sub-frames, filter processing with high precision can also be performed on moving images, and an appropriate result can be obtained. For example, in a case where a moving object is passing in front of a stationary background, it is possible to display the stationary background with higher precision.

Modified Example of Embodiment 1

In Embodiment 1, pixel values of interpolation pixels necessary for enlargement processing are obtained by performing filter processing. Specifically, the pixel value of the pixel 401 shown in FIG. 9B is obtained by referring to the 10×10 pixels in FIG. 4A. The pixel value of the pixel 421 that is above and adjacent to the pixel 401, and the pixel value of the pixel 422 that is on the right of and adjacent to the pixel 401 can also be obtained in the same manner. In this case, 100 pixels denoted by X00 to X99 may be referred to, or other pixels may be referred to. Further, filter coefficients used when obtaining the pixel values of the pixels 421 and 422 may be the same as the filter coefficients used when obtaining the pixel value of the pixel 401 or may be different therefrom.

In Embodiment 1, FIR filter processing is performed using the horizontal calculation circuit 105 and the perpendicular calculation circuit 106. However, in this modified example, the filter to be used is not limited to an FIR filter. For example, a general convolution filter can also be used. As shown in FIGS. 5A to 5D, the filter switching unit 108 sets five coefficients in the horizontal calculation circuit 105, and sets five coefficients in the perpendicular calculation circuit 106 in Embodiment 1.

In the case where a general convolution filter is used, the filter switching unit 108 may set 25 filter coefficients in a filter circuit used instead of the horizontal calculation circuit 105 and the perpendicular calculation circuit 106. In this case, the filter circuit may multiply the reference pixels by one of the filter coefficients. Then, the filter circuit may obtain an output pixel value by totaling the obtained values.

Embodiment 2

In the present embodiment, a frame image is enlarged by performing filter processing on the frame image as in Embodiment 1. However, in the present embodiment, a moving image is displayed by 9×-speed driving. The configuration of an image processing apparatus according to the present embodiment is the same as that in Embodiment 1 shown in FIG. 1. Also, the flowchart of processing according to the present embodiment is the same as that in Embodiment 1 shown in FIG. 6A. Below is a description of differences from Embodiment 1.

Ordinarily, the sum total of coefficients of a two-dimensional lowpass filter used when performing enlargement processing and for obtaining interpolation pixels is approximately 1. As shown in FIG. 3B, if filter coefficients are equally divided into four groups, the sum total of filter coefficients used for each sub-frame is approximately 0.25. In Embodiment 1, the result of filter calculation is increased four times by the amplification unit 110. As described above, since the sum total of filter coefficients is 0.25, if sub-frame images having uniform pixels whose pixel value is, for example, 80, the value to be obtained will be as follows: 80×0.25×4=80. Thus, if filter coefficients are equally divided as in Embodiment 1, there is a low possibility that the value obtained by performing filter processing will overflow.

Figure 8:
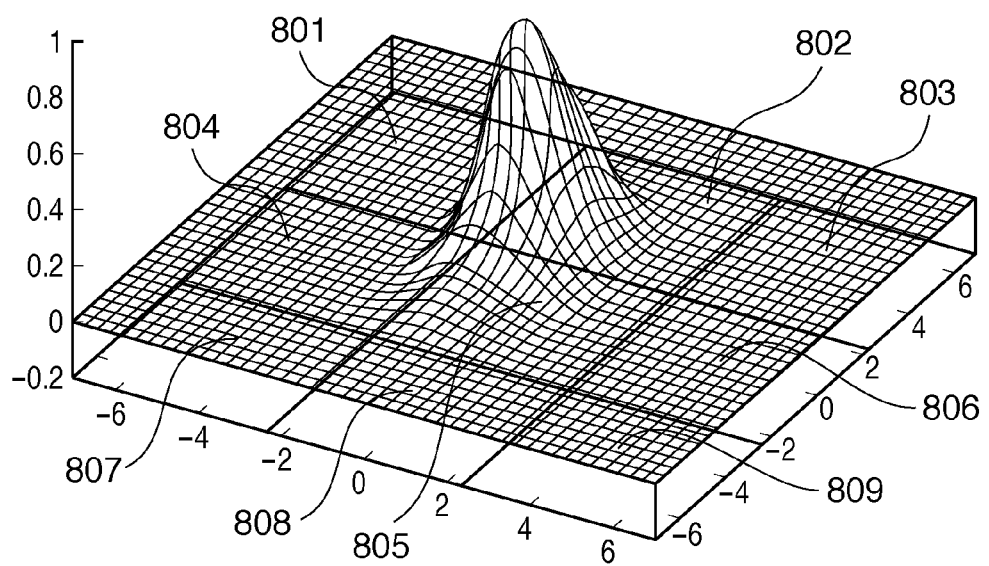
FIG. 8 is a diagram showing filter coefficients according to Embodiment 3.

On the other hand, in the present embodiment, filter coefficients are divided into nine groups denoted by reference numerals 801 to 809 as shown in FIG. 8. In this case, the value of the filter coefficient group 805 is larger than those of the other groups. Moreover, in the present embodiment, the amplification unit 110 increases the value obtained as a result of filter calculation by nine times. In this case, an output pixel value may not be able to be represented using a predetermined number of bits, and an overflow may occur. Then, a value (saturation value) exceeding the value (upper limit value or predetermined value) that can be represented using the predetermined number of bits will be recorded as an upper limit value. In this case, the pixel values of sub-frame images will be different from those obtained as a result of filter processing. Accordingly, the pixel value perceived by human eyes by successively displaying sub-frame images will be different from the pixel value obtained by performing filter processing on a frame image.

In view of this, in the present embodiment, filter calculation is performed using filter coefficient groups in descending order of the sum total of filter coefficients. If an overflow occurs, the amplification unit 110 stores the difference between a calculated result (calculation value) and the upper limit value. Then, the amplification unit 110 adds the stored difference to the next sub-frame. A memory in which the amplification unit 110 stores the difference is used only when the same image is output N times. Accordingly, if a circuit that uses a frame memory (overdrive circuit, for example) only when there is inter-frame movement is provided, the amplification unit 110 can share the frame memory with this circuit.

Processing according to the present embodiment will be described with reference to the flowchart in FIG. 6A. Below is a description of differences from Embodiment 1. In step S601, the sub-frame count unit 107 initializes N to 1. Further, the amplification unit 110 initializes a sum total value to 0. In step S603, the reading control unit 109 determines whether or not an image in the area in which filter processing is performed is the same for nine sub-frames.

In step S604, the sub-frame determination unit 103 sets the filter storage unit 104 such that the filter storage unit 104 outputs 15×15 coefficients. In step S605, the filter switching unit 108 selects a filter coefficient group having 5×5 filter coefficients for the sub-frame number i from among the 15×15 filter coefficients output from the filter storage unit 104. At this time, the filter switching unit 108 selects a filter coefficient group in descending order starting from a group having the largest sum total of filter coefficients. For example, the filter coefficient group 805 is selected for the sub-frame number 1. In step S606, the reading control unit 109 reads the pixel values of reference pixels corresponding to the filter coefficient group selected in step S605. It is sufficient for the reading control unit 109 to read 5×5 pixel values of pixels with the pixel of interest in the center for the filter coefficient group 805. On the other hand, it is sufficient for the reading control unit 109 to read 5×5 pixel values of pixels that are positioned on the right of the 5×5 pixels with the pixel of interest in the center for the filter coefficient group 806.

Figure 6B:
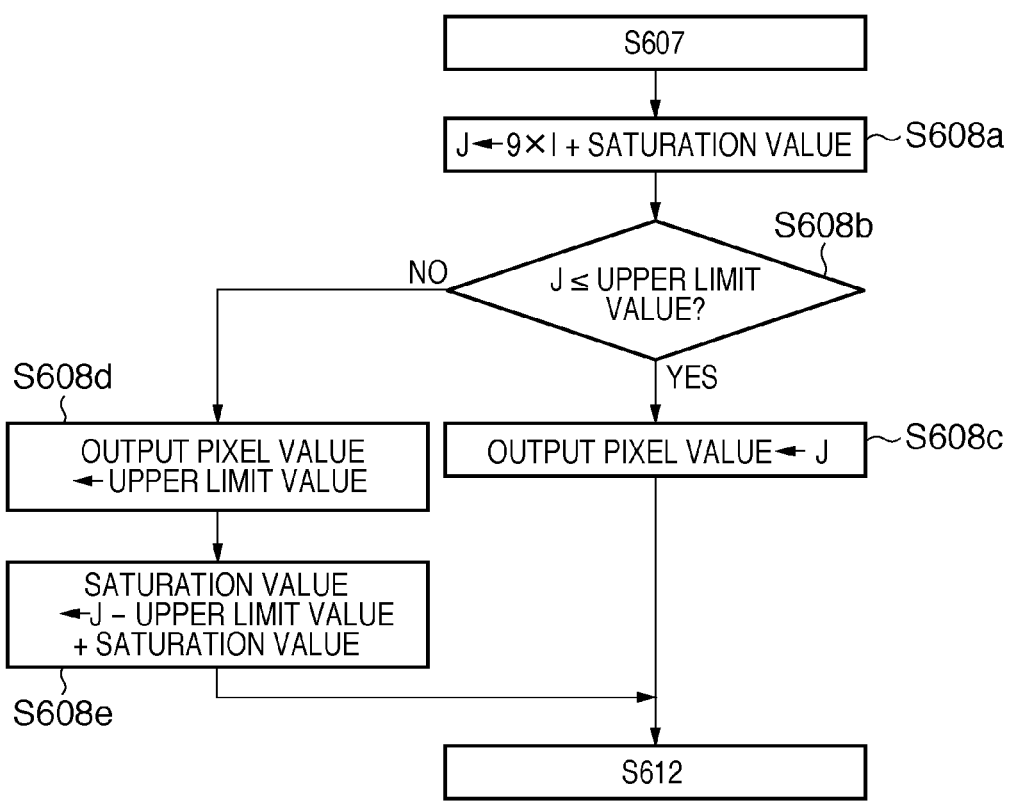

In the present embodiment, steps S608a to S608e shown in FIG. 6B are performed, instead of step S608. In step S608a, the amplification unit 110 increases the value calculated in step S607 by nine times, and adds a saturation value thereto. If the value calculated in step S607 is assumed to be I, a value J obtained in step S608a is obtained in accordance with Expression (7) below.

$$J \leftarrow 9 \times I + \text{saturation value} \quad (7)$$

In step S608b, the amplification unit 110 determines whether or not the calculation result J in step S608a can be represented using the predetermined number of bits. It is sufficient for the amplification unit 110 to determine whether or not J exceeds the maximum value (limit value) that can be represented using the predetermined number of bits. If J does not exceed the limit value, the processing proceeds to step S608c. If J exceeds the limit value, the processing proceeds to step S608d.

In step S608c, the amplification unit 110 outputs J as an output pixel value. In step S608d, the amplification unit 110 outputs the limit value as an output pixel value. In step S608e, the amplification unit 110 updates the saturation value and records the resultant value. For example, the amplification unit 110 updates the saturation value by calculation as shown by Expression (8) below.

$$\text{Saturation value} \leftarrow J - \text{upper limit value} + \text{saturation value} \quad (8)$$

The processing in steps S609 to S615 is the same as that in Embodiment 1. According to the method in the present embodiment, even in a case where an overflow occurs due to not equally dividing filter coefficients, sub-frame images that can be correctly perceived by people can be generated by recording a saturation value.

Embodiment 3

In Embodiment 2, an overflow is handled by recording a saturation value. In the present embodiment, the occurrence of an overflow is suppressed by using a different method of dividing filter coefficients from that in Embodiment 2. In the present embodiment, a moving image is also displayed by 9×-speed driving as in Embodiment 2. The configuration of an image processing apparatus according to the present embodiment is the same as that in Embodiment 1 shown in FIG. 1. Further, the flowchart of processing according to the present embodiment is also the same as that in Embodiment 1 shown in FIG. 6A.

Figure 7B:
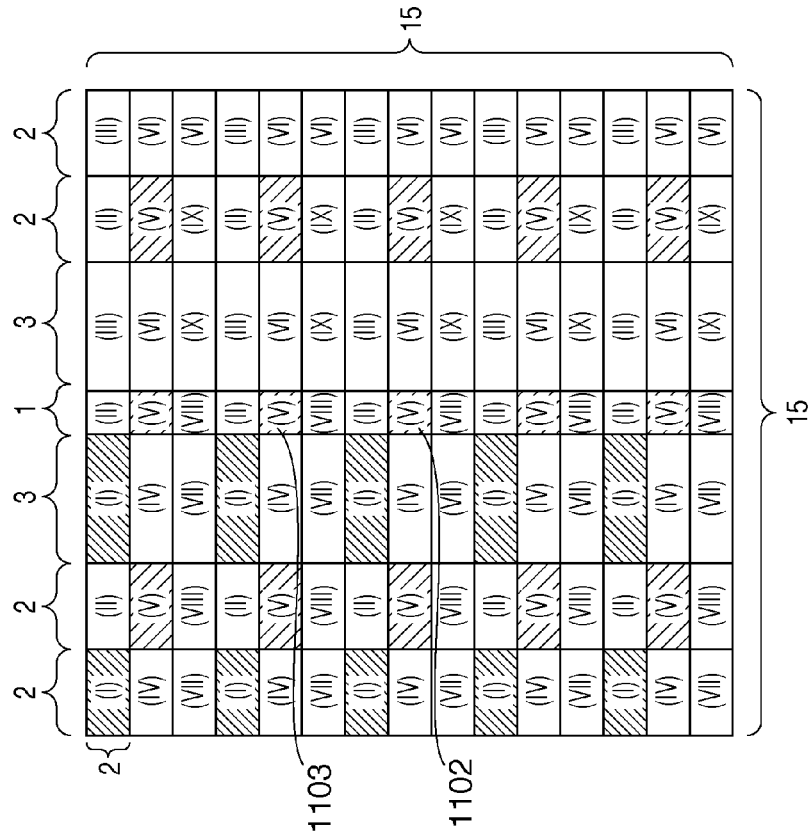
FIGS. 7A and 7B are diagrams illustrating examples of division of filter coefficients according to Embodiment 3.
Figure 7A:
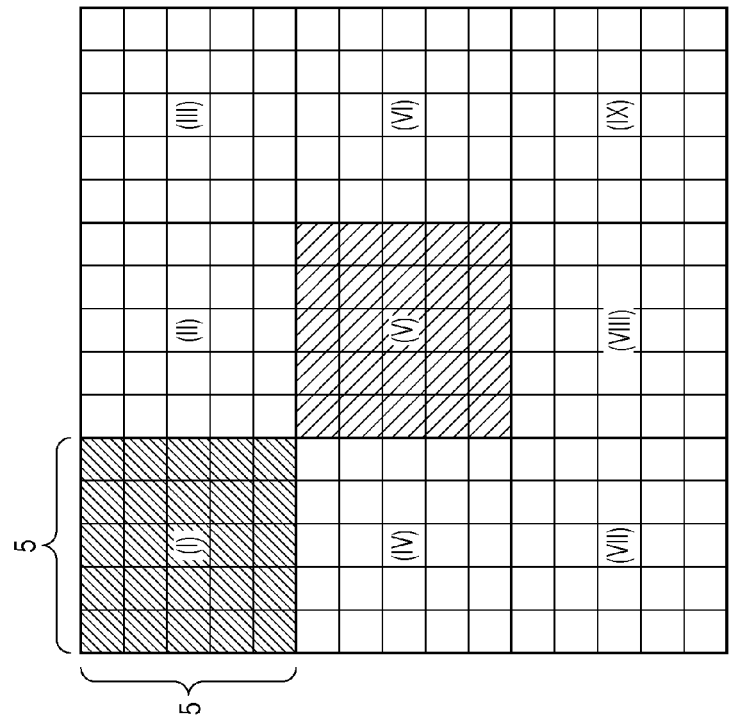

FIGS. 7A and 7B show a method of dividing filter coefficients according to the present embodiment. FIG. 7A shows a method of dividing filter coefficients according to Embodiment 2. As described above, large filter coefficients concentrate in a filter coefficient group (V). In contrast, FIG. 7B shows a method of dividing filter coefficients according to the present embodiment. According to the method in the present embodiment, large filter coefficients do not concentrate in any of filter coefficient groups (I) to (IX). Consequently, the occurrence of an overflow can be suppressed.

In the present embodiment, filter calculation is performed using reference pixels according to the positions of filter coefficients. For example, in a case of performing filter processing on a fifth sub-frame, filter coefficients indicated by (V) in FIG. 7B are used. At this time, it is sufficient to apply a filter coefficient 1102 to the pixel value of a pixel of interest. Further, it is sufficient to apply a filter coefficient 1103 to a pixel three pixels above the pixel of interest. In Embodiments 1 and 2, reference pixels are successively read from the frame memory 111. However, in the present embodiment, reference pixels are read discretely in accordance with the positions of filter coefficients. As described above, according to the method in the present embodiment, the occurrence of an overflow can be suppressed by setting nine filter coefficient groups such that large values will not concentrate in a filter coefficient group used for one sub-frame image.

Other Embodiments

An example in the case of performing 4×-speed processing is described in Embodiment 1, and an example in the case of 9×-speed processing is described in Embodiments 2 and 3. However, more ordinarily, the methods in the embodiments described above can be modified and applied in the case where moving image NX-speed processing (2≤N) for NX-speed driving display is performed. Further, a plurality of (N) filter coefficient groups are prepared, and the filter coefficient groups are respectively applied to reference pixel groups at different positions, which is sufficient to perform filter processing with high precision using a filter with a small number of taps.

For example, it is not necessary to use all pixels in a rectangular region as reference pixels, as in the embodiments described above. It is sufficient to use a pixel at a predetermined position from the pixel of interest as a reference pixel. For example, in FIG. 4A, if X44 denotes a pixel of interest, only pixels denoted by Xab (a and b represent even number) may be used as reference pixels.

The number of filter coefficients and the number of reference pixels do not need to be common for all sub-frame images. Accordingly, the methods in the embodiments described above are also applicable to the case of performing 3×-speed processing, for example. For example, if X44 denotes a pixel of interest in FIG. 4A, it is sufficient to use X00 to X29 as reference pixels for the first sub-frame image. Further, it is sufficient to use X30 to X69 as reference pixels for the second sub-frame image, and use X70 to X99 as reference pixels for the third sub-frame image. In this case, it is sufficient to prepare filter coefficients for each sub-frame image.

In the embodiments described above, an original filter is divided such that filter coefficient groups do not overlap. However, division may be performed such that filter coefficient groups overlap. For example, division may be performed such that if the sum of coefficients is obtained in a state where the filter coefficient groups are partially superposed, that sum is equal to that of the coefficients of the original filter.

For example, in Embodiment 1, the average value of the values of the interpolation pixel 401 in the sub-frames is equal to the interpolation pixel value calculated using a 10×10 tap filter. This is suitable for a hold-type display apparatus such as a liquid crystal display, for example. On the other hand, for the use in an impulse-type display apparatus, the average value of the values of the interpolation pixel 401 in the sub-frames may be equal to the interpolation pixel value calculated using a 10×10 tap filter.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-181101, filed Aug. 12, 2010, which is hereby incorporated by reference herein in its entirety.

What is claimed is:

1. An image processing apparatus for generating, from a frame image, first to Nth (N≥2) sub-frame images for NX-speed driving display, the apparatus comprising:
   an input unit configured to input the frame image;
   a generation unit configured to generate, from the frame image, first to Nth intermediate images;
   a holding unit configured to hold first to Nth sub-filters that have been generated by dividing an original filter, and relative position information of pixels referred to by each of the sub-filters;
   a collection unit configured to collect pixel values of pixels in an ith intermediate image (1≤i≤N), the pixels being at relative positions indicated by the relative position information for an ith sub-filter with respect to a pixel of interest in the ith intermediate image; and
   a calculation unit configured to create the N sub-frame images by obtaining a pixel value of the pixel of interest in an ith sub-frame image from a calculation value obtained using the ith sub-filter with respect to the pixel values collected by the collection unit,
   wherein an average value of pixel values of a pixel in the N sub-frame images is the same as a value of that pixel obtained using the original filter with respect to the frame image, and
   wherein at least one of the units is implemented by a computer.

2. The image processing apparatus according to claim 1, wherein the calculation unit is further configured to:
   acquire a calculation value obtained by the calculation using the ith sub-filter as the pixel value of the pixel of interest in the ith sub-frame image if the calculation value does not exceed a predetermined value; and
   acquire the predetermined value as the pixel value of the pixel of interest in the ith sub-frame image, and add a difference between the calculation value and the predetermined value to a result of calculation using an i+1th sub-filter, if the calculation value exceeds the predetermined value.

3. The image processing apparatus according to claim 1, further comprising:
   an enlargement unit configured to obtain an enlarged image obtained by enlarging the intermediate images, using the intermediate images and the sub-frame images.

4. An image processing apparatus for generating, from a frame image, first to Nth (N≥2) sub-frame images for NX-speed driving display, the apparatus comprising:
   an input unit configured to input the frame image;
   a generation unit configured to generate, from the frame image, first to Nth intermediate images by referring to two successive frame images and performing interpolation processing;
   a holding unit configured to hold first to Nth sub-filters that have been generated by dividing an original filter, and relative position information of pixels referred to by each of the sub-filters;
   a collection unit configured to collect pixel values of pixels in an ith intermediate image (1≤i≤N), the pixels being at relative positions indicated by the relative position information for an ith sub-filter with respect to a pixel of interest in the ith intermediate image;
   a determination unit configured to determine whether a pixel value of a pixel in neighborhood of a pixel of interest in each of the intermediate images is the same for the N intermediate images; and
   a calculation unit configured to create the N sub-frame images by obtaining a pixel value of the pixel of interest in an ith sub-frame image from a calculation value obtained using the ith sub-filter with respect to the pixel values collected by the collection unit,
   wherein the calculation unit is further configured to perform calculation using the ith sub-filter with respect to the pixel values collected by the collection unit if the determination unit determines that the pixel values are the same, and acquires, if the determination unit determines that the pixel values are not the same, pixel values of the pixel of interest in the sub-frame images by performing calculation using a filter other than the sub-filters with respect to the pixel values of the pixel in the neighborhood of the pixel of interest in the intermediate images, and
   an average value of the pixel values of the pixel of interest in the N sub-frame images that have been calculated by the calculation unit using the sub-filters is the same as a value obtained using the original filter with respect to a pixel value of a pixel in neighborhood of a pixel of interest in the frame image,
   wherein at least one of the units is implemented by a computer.

5. An image processing method for generating, from a frame image, first to Nth (N≥2) sub-frame images for NX-speed driving display, the method comprising the steps of:
   inputting the frame image;
   generating, from the frame image, first to Nth intermediate images;
   holding first to Nth sub-filters that have been generated by dividing an original filter, and relative position information of pixels referred to by each of the sub-filters;
   collecting pixel values of pixels in an ith intermediate image (1≤i≤N), the pixels being at relative positions indicated by the relative position information for an ith sub-filter with respect to a pixel of interest in the ith intermediate image; and creating the N sub-frame images by obtaining a pixel value of the pixel of interest in an ith sub-frame image from a calculation value obtained using the ith sub-filter with respect to the collected pixel values, wherein an average value of pixel values of a pixel in the N sub-frame images is the same as a value of that pixel obtained using the original filter with respect to the frame image.

* * * * *